United States Patent
Brinker et al.

(10) Patent No.: US 11,454,570 B2
(45) Date of Patent: Sep. 27, 2022

(54) SAMPLE PROBE FOR DISSOLUTION TESTING AND THE LIKE

(71) Applicant: Distek, Inc., North Brunswick, NJ (US)

(72) Inventors: Jeffrey Brinker, Westfield, NJ (US); Shawn Craig, Jobstown, NJ (US); Peter K. Schultz, High Bridge, NJ (US); Timothy John Nadolski, Maple Grove, MN (US)

(73) Assignee: Distek, Inc., North Brunswick, NJ (US)

( * ) Notice: Subject to any disclaimer, the term of this patent is extended or adjusted under 35 U.S.C. 154(b) by 922 days.

(21) Appl. No.: 16/078,120

(22) PCT Filed: Feb. 28, 2017

(86) PCT No.: PCT/US2017/019963
§ 371 (c)(1),
(2) Date: Aug. 21, 2018

(87) PCT Pub. No.: WO2017/151624
PCT Pub. Date: Sep. 8, 2017

(65) Prior Publication Data
US 2019/0049344 A1   Feb. 14, 2019

Related U.S. Application Data

(60) Provisional application No. 62/301,181, filed on Feb. 29, 2016.

(51) Int. Cl.
*G01N 1/10* (2006.01)
*B01L 3/00* (2006.01)

(52) U.S. Cl.
CPC ............ *G01N 1/10* (2013.01); *B01L 3/50825* (2013.01); *B01L 3/561* (2013.01); *B01L 3/563* (2013.01);
(Continued)

(58) Field of Classification Search
CPC .............. G01N 1/10; G01N 2001/1025; B01L 3/50825; B01L 3/561; B01L 3/563;
(Continued)

(56) References Cited

U.S. PATENT DOCUMENTS 4,127,131 A    11/1978  Vaillancourt
5,588,559 A *  12/1996  Vallet Mas ............. A61J 1/145
                                             210/445
(Continued)

FOREIGN PATENT DOCUMENTS

FR           2952069 A1    5/2011
WO    WO 2015090878 A1    6/2015

OTHER PUBLICATIONS

International Search Report and Written Opinion; dated Aug. 14, 2017 for PCT Application No. PCT/US2017/019963.
(Continued)

*Primary Examiner* — Samuel P Siefke
*Assistant Examiner* — Quocan B Vo
(74) *Attorney, Agent, or Firm* — Mendelsohn Dunleavy, P.C.; Steve Mendelsohn (57) ABSTRACT

In one embodiment, a sample probe has a cap and a base, wherein the cap includes a grip portion and a projection portion. The projection portion fits within a hollow portion of a filter such that the filter is disposed on the outside of the projection portion and the filter and the cap form a cap assemblage. The base comprises a base recess that receives a portion of the cap assemblage including the filter. The cap and base include corresponding media transfer regions adjacent and connected to the filter that reduces flow resistance and chances of blockage and/or contamination during dissolution-testing sampling using the sample probe.

21 Claims, 8 Drawing Sheets

(52) U.S. Cl.
CPC ... *B01L 2200/026* (2013.01); *B01L 2300/042* (2013.01); *B01L 2300/046* (2013.01); *B01L 2300/0681* (2013.01); *B01L 2300/0832* (2013.01); *B01L 2300/0838* (2013.01); *G01N 2001/1025* (2013.01)

(58) Field of Classification Search
CPC ....... B01L 2300/046; B01L 2300/0838; B01L 2300/0832; B01L 2200/026; B01L 2300/042; B01L 2300/0681
See application file for complete search history.

(56) References Cited

U.S. PATENT DOCUMENTS

| 5,976,824 | A | 11/1999 | Gordon | |
|---|---|---|---|---|
| 7,850,919 | B2 | 12/2010 | Renslow | |
| 8,636,151 | B2* | 1/2014 | Duval | B01D 25/001 |
| | | | | 210/436 |
| 2005/0139547 | A1 | 6/2005 | Manoussakis et al. | |
| 2007/0287193 | A1* | 12/2007 | Pressman | B01L 3/502 |
| | | | | 436/178 |
| 2010/0202929 | A1* | 8/2010 | Renslow | B01L 3/50825 |
| | | | | 422/513 |
| 2015/0338311 | A1 | 11/2015 | Marek et al. | |
| 2017/0319842 | A1* | 11/2017 | Wiley | A61M 39/0208 |

OTHER PUBLICATIONS

International Preliminary Report on Patentability; dated Jul. 9, 2018 for PCT Application No. PCT/US2017/019963.

Communication pursuant to Rule 164(2)(b) and Article 94(3) EPC; Application No. 17711053.3; dated Mar. 14, 2019.

* cited by examiner

SAMPLE PROBE FOR DISSOLUTION TESTING AND THE LIKE

This application claims the benefit of the filing date of U.S. Provisional Application No. 62/301,181 filed on Feb. 29, 2016, the teachings of which are incorporated herein by reference in their entirety.

BACKGROUND

The present disclosure relates to sample probes used in dissolution testing and similar applications and more specifically, although not exclusively, to sample probes that include a filter.

Some pharmaceutical drugs are in dosage forms such as tablets or capsules that are intended to be taken orally by a patient. These dosage forms dissolve in the fluids of the patient's gastrointestinal (GI) tract prior to absorption into the patient's bloodstream. The rate of dissolution of the tablet or capsule is important to know and is assessed by dissolution testing. Dissolution testing is a critical performance measure in pharmaceutical tablet and capsule production and is subject to regulatory standards and guidelines such as—in the U.S.—the United States Pharmacopeia (USP).

Dissolution tests typically involve introducing a sample dosage form into a controlled liquid medium in a vessel, where the medium is designed to imitate a patient's GI fluids, agitating the medium, and then intermittently taking samples, using sample probes, from the medium at specific time points to analyze the dissolution of the dosage form in the medium. Filters are used along with the sample probes to trap and prevent un-dissolved particles of the dosage form and/or other contaminates from contaminating the sample. When using filters, a small amount of the media may be pushed back in the reverse direction (known as "reflux" or "back-flushing") to wash particles off the filter back into the vessel. Failure to do this can result in the particles staying on the filter, such that, when another sample of the media is subsequently pulled through the filter at the next time point, particles stuck to the filter can contribute to the later sample, thereby giving erroneously high readings.

Some conventional sample probes are essentially manually operated syringes with cannulas—which are thin rigid tubes, typically made of stainless steel—used to sample the medium at selected times. These probes may include stoppers to ensure that the distal end of the cannula reaches the same depth in the vessel every time a sample is taken.

Another conventional sample probe type is the stationary sample probe, which rests on or in a vessel cover, where the cannula's distal end sits stationary in the vessel as the dissolution testing is taking place and which is connected to an automated mechanism for withdrawing medium samples from the vessel. The presence of the cannula can, however, create some turbulence in the vessel as the medium is agitated.

Yet another conventional sample probe type is the moving sample probe, which is attached to a reciprocating platform. The reciprocating platform lowers and raises the sample probe. When a sample needs to be taken, the sample probe is lowered and the distal end of the cannula is inserted into the medium to a required depth, a sample is taken, and then the cannula is raised out of the medium. Consequently, most of the time, the cannula is outside of the medium. This greatly reduces the turbulence in the vessel compared to the stationary sample probe.

Sample probes may have in-line filters located along the fluid path for samples extracted from the vessel. In-line filters are prone to clogging and must be removed periodically for cleaning or replacement. Several conventional sample probes are described and illustrated in U.S. Pat. No. 7,850,919 to Renslow, incorporated herein by references in its entirety.

Figure 1:
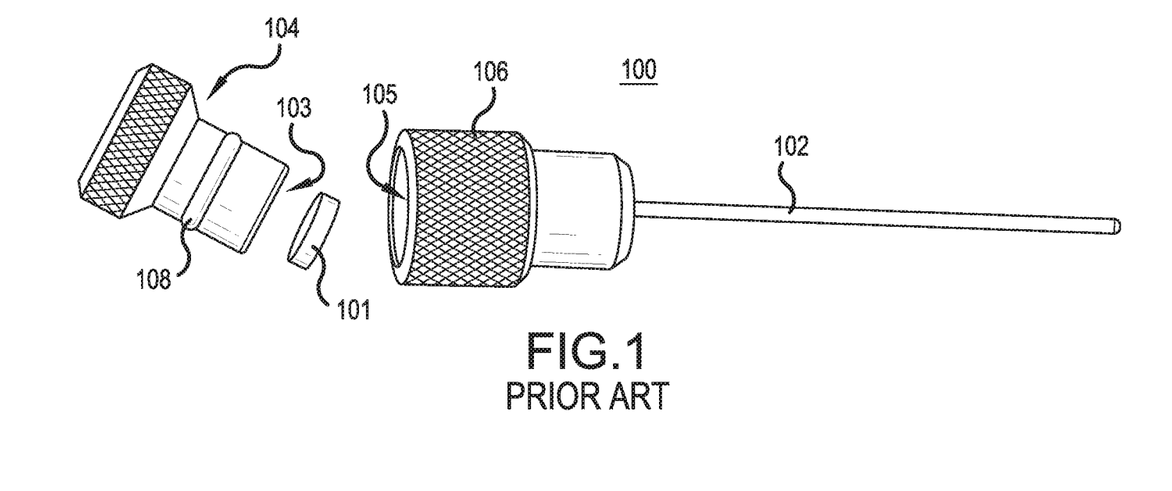
FIG. 1 is an exploded perspective side view of a first conventional sample probe having an in-line filter.

FIG. 1 is an exploded perspective view of a first conventional sample probe 100 having a cylindrical in-line filter 101. Sample probe 100 further comprises a cannula 102 attachable to a base 106, a cap 104 also attachable to the base 106, and an O ring 108. Filter 101 fits into a cylindrical recess 103 in the cap 104. The cap 104 fits into a cylindrical recess 105 of the base 106. The cap 104 is held in place within the base 106 with the help of friction from the 0 ring 108, which also helps prevent leakage of medium from the sample probe. When the time comes to replace the filter 101, it may be difficult to remove the filter from the recess 103 because the filter 101 both sits completely within the recess 103 and substantially fills the recess 103, so that filter 101 may get stuck within the recess 103.

Figure 2:
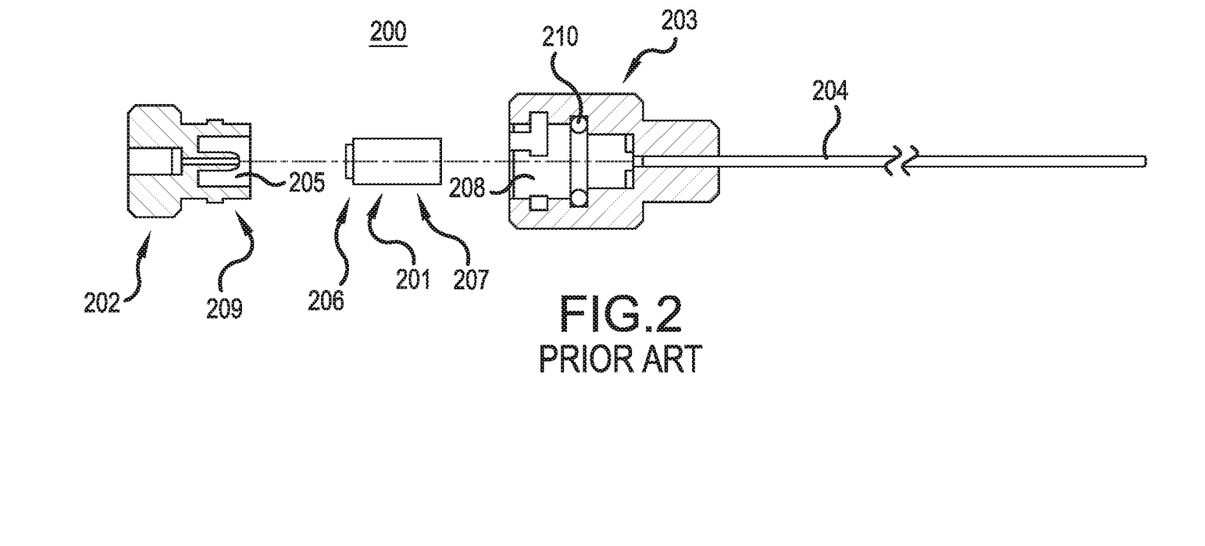
FIG. 2 is a cross-sectional view of a second conventional sample probe with an easier-to-replace in-line filter.

FIG. 2 is a cross-sectional view of a second conventional sample probe 200 with an easier-to-replace cylindrical in-line filter 201. The sample probe 200 further comprises a cap 202, a base 203, and a cannula 204 insertable in the base 203. The cap 202 has a cylindrical recess 205 into which a proximal portion 206 of the filter 201 fits. The distal portion 207 of the filter 201 protrudes out of the cap 202 for easier access for removal of the filter 201. The distal portion 207 of the filter 201, as well as the distal portion 209 of the cap 202, fit into a cylindrical recess 208 in the base 203. The base 203 further includes an annular recess for receiving an o-ring 210, which provides a seal between the base 203 and the cap 202 when the cap 202 is inserted in the base 203.

SUMMARY

One embodiment of the disclosure can be an article of manufacture comprising a cap having a projection with a duct through the projection and a base having a recess and a duct in fluid communication with the recess. The projection is adapted to fit within a recess of a filter to form a cap-filter assemblage. The filter and the projection of the cap-filter assemblage are adapted to fit within the recess of the base to form a cap-filter-base assemblage. The cap-filter-base assemblage defines at least one media transfer region adjacent to the filter. The duct of the base in the cap-base assemblage is adapted to receive a cannula to form a sample probe.

Another embodiment of the disclosure can be the filter for the above-described article of manufacture.

BRIEF DESCRIPTION OF THE DRAWINGS

Other aspects, features, and advantages of the disclosure will become more fully apparent from the following detailed description, the appended claims, and the accompanying drawings in which like reference numerals identify similar or identical elements.

DETAILED DESCRIPTION

Figure 3:
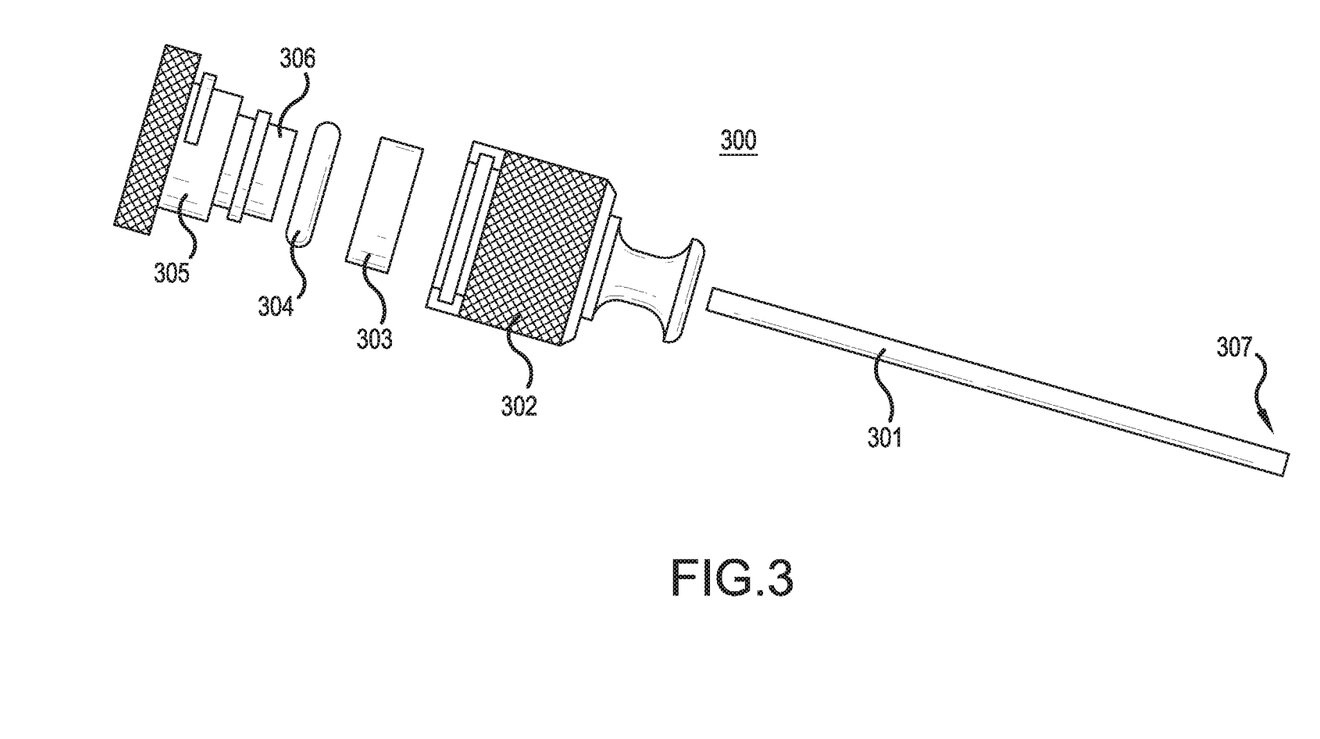
FIG. 3 is an exploded side view of a sample probe in accordance with one embodiment of the invention.

FIG. 3 is an exploded side view of sample probe 300 in accordance with one embodiment of the invention. Sample probe 300 may be used in a dissolution-test system (not shown). Sample probe 300 comprises a cannula 301 attached to a base 302, a filter 303, an o-ring 304, and a cap 305.

Figure 4:
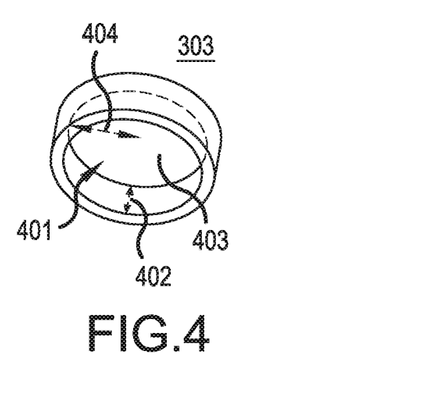
FIG. 4 is a perspective view of the filter of FIG. 3.
Figure 5:
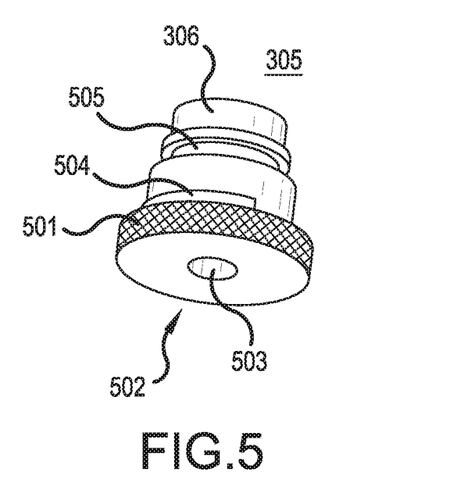
FIG. 5 is a perspective view of the cap of FIG. 3.
Figure 6:
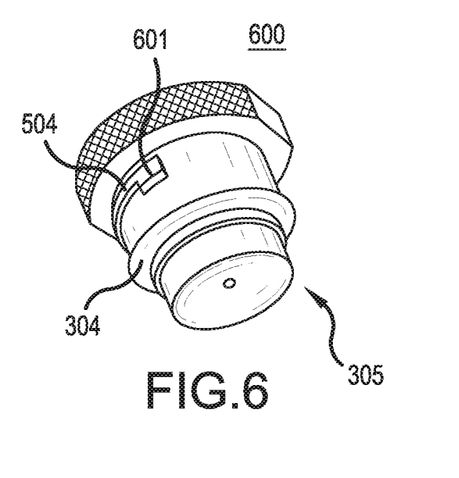
FIG. 6 is a perspective view of an assemblage comprising the cap and the o-ring of FIG. 3.
Figure 7:
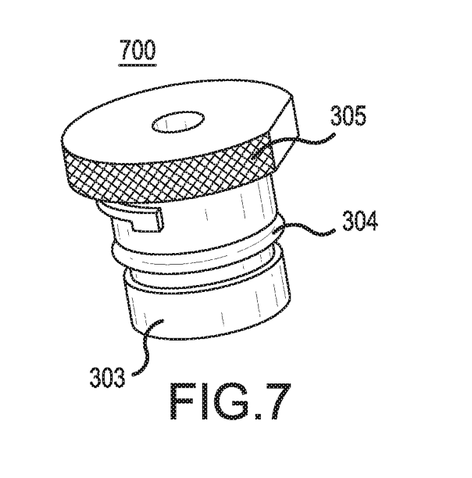
FIG. 7 is a perspective view of an assemblage comprising the cap, the o-ring, and the filter of FIG. 3.
Figure 8:
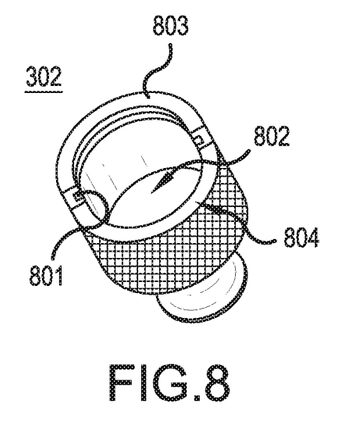
FIG. 8 is a perspective view of the base of FIG. 3.
Figure 9:
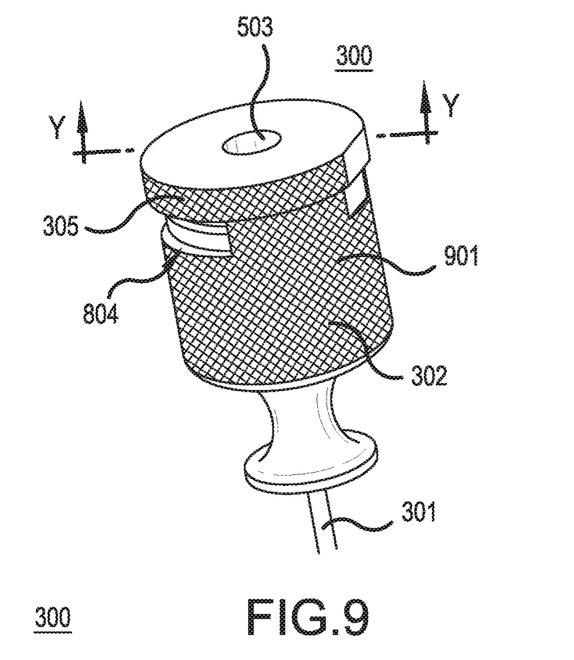
FIG. 9 is a perspective view of part of the sample probe of FIG. 3 when assembled.
Figure 10:
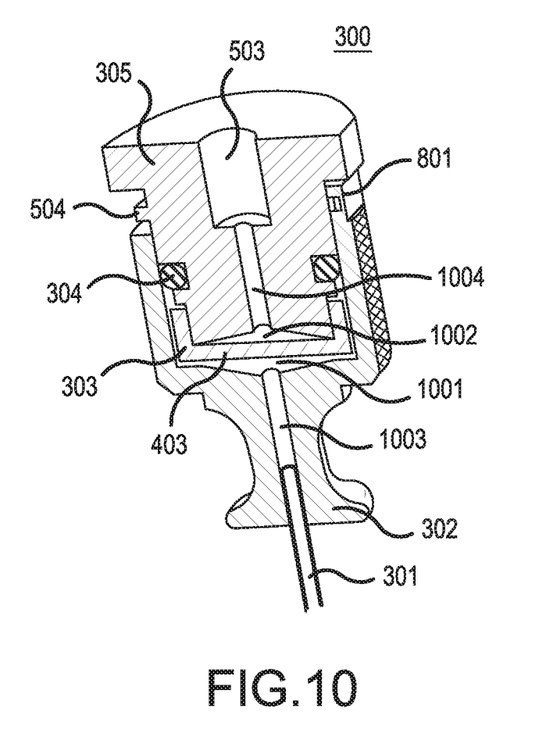
FIG. 10 is a cross-sectional perspective view of the assembled sample probe of FIG. 9 along a cut line.

FIG. 4 is a perspective view of the filter 303 of FIG. 3. FIG. 5 is a perspective view of the cap 305 of FIG. 3. FIG. 6 is a perspective view of an assemblage 600 comprising the cap 305 and the o-ring 304 of FIG. 3. FIG. 7 is a perspective view of an assemblage 700 comprising the cap 305, the o-ring 304, and the filter 303 of FIG. 3. FIG. 8 is a perspective view of the base 302 of FIG. 3. FIG. 9 is a partial perspective view of the sample probe 300 of FIG. 3 when assembled. FIG. 10 is a cross-sectional perspective view of the assembled sample probe 300 along cut line Y-Y of FIG. 9.

As shown in FIG. 4, the filter 303 has a substantially cylindrical shape and a substantially cylindrical recess 401 having a depth 402 and that defines a circular bottom 403. The inner and/or outer walls of the filter 303 may be tapered for a tighter seal with the cap 305 and/or the base 302, respectively. The filter 303 mates with the cap 305 by receiving a distal projection 306 of the cap 305 within the filter's recess 401. The depth 402 may be smaller than the radius 404 of the recess 401.

In some embodiments, the depth 402 is less than half of the radius 404 of the recess 401. This helps make easier the mating and de-mating of the filter 303 with the cap 305. In general, a relatively short depth 402 avoids an unnecessarily large surface-area contact between the filter 303 and the distal projection 306, which may otherwise make removal of the filter 303 from the cap 305 more difficult. In addition, in embodiments where the filter 303 is sufficiently flexible and/or thin, a relatively short depth 402 makes removal of the filter 303 by flexing the filter 303 off the cap 305 easier.

The filter 303 is porous to liquids, but not to particulate matter of greater than a certain size, so as to allow liquid medium to pass through, but not un-dissolved particles. The filter 303 may, for example, be made of ultra-high-molecular-weight (UHMW) polyethylene for larger porosities or Poroplast for lower porosities (1-5 μm), which are completely inert to most compounds. Note that, in some alternative embodiments, only the bottom 403 of the filter 303 comprises a filtering material as described above, while the rest of the filter 303 comprises a material that may be excessively or insufficiently porous. These embodiments may allow the use of a cheaper material for those portions of the filter 303 that are not along the fluid path of the sample probe 300 without adversely affecting performance.

As shown in FIG. 5, the cap 305 comprises a proximal grip portion 501 that remains exposed when the sample probe 300 is assembled. The grip portion 501 may have bumps, knurls, or other features to enhance the ability to grip the cap 305. The outside top surface of the grip portion 501 may be provided with indicia 502 to show the user how to mate/de-mate the cap 305 with respect to the base 302 (e.g., by turning clockwise/counterclockwise to lock/unlock). The grip portion 501 also has a cylindrical recess 503 for receiving a channeled projection of the dissolution testing apparatus (not shown), where the recess 503 and the projection form part of the fluid path extending from the distal end 307 (FIG. 3) of the cannula 301 to the dissolution-testing apparatus for transporting the medium samples.

The cap 305 further comprises a lateral protrusion 504 for insertion into a corresponding lateral channel 801 (FIG. 8) in the base 302 to more securely attach the cap 305 to the base 302 when the sample probe 300 is assembled. The lateral protrusion 504 is engaged with the lateral channel 801 by inserting the distal end of the cap 305 in the recess 802 of the base 302 to align the protrusion 504 longitudinally with the channel 801 and then rotating the cap 305 relative to the base 302 to slide the lateral protrusion 504 into the lateral channel 801 to prevent the cap 305 from moving longitudinally with respect to the base 302. The lateral protrusion 504 includes a stopper 601, which is wider than the channel 801, at one end of the lateral protrusion 504 in order to limit the angle of rotation of the cap 305 relative to the base 302. In some alternative embodiments, the channel 801 incorporates a stopper in conjunction with, or instead of, the stopper 601.

The cap 305 has an external annular recess 505 that receives the o-ring 304, which is sized to fit snugly in the annular recess 505.

The cap 305 has a substantially cylindrical, distal projection 306 sized to snugly fit within the cylindrical recess 401 of the filter 303. Specifically, the outer radius of the cap's cylindrical projection 306 is substantially equal to the inner radius of the filter's cylindrical recess 401 so that when the filter 303 and the cap 305 are mated, they have a snug friction fit. Because the filter 303 is disposed on the outside of the cap 305, the filter 303 can easily be accessed for removal by sliding and/or flexing filter 303 off of the projection 306 when the cap 305 is decoupled from the base 302.

As shown in FIG. 10, the distal end of the cap 305 has a cone-like depression that forms media transfer region 1002 between the cap's projection 306 and the filter's bottom 403. A relatively narrow cylindrical duct 1004 connects the media transfer region 1002 to the recess 503.

As shown in FIG. 8, the base 302 has a cylindrical recess 802 that receives the distal end of the assemblage 700 of FIG. 7 having the filter 303 and the o-ring 304. The base 302 also has a semi-circular raised rim 803 that incorporates the above-described lateral channel 801 for receiving the lateral protrusion 504 of the cap 305 so that, when the sample probe 300 is assembled by mating the assemblage 700 with the base 302, the cap 305 may be securely locked to the base 302. As described above, in order to lock the cap 305 to the base 302, first the distal end of the assemblage 700 is inserted into the base's recess 802 such that the cap's lateral protrusion 504 is aligned with the semi-circular rimless section 804 of the base 302. Then, the cap 305 is rotated relative to the base 302 so that the protrusion 504 slides into the channel 801 with a friction fit, thereby locking the cap 305 to the base 302. The channel 801 and/or the protrusion 504 may be shaped and/or have sub-protrusions so as to increase the friction fit. Similarly, alternative coupling mechanisms may be used instead of protrusion 504 and channel 801 to help prevent undesirable separation of components of the sample probe 300 (e.g., during reflux). For example, the cap 305 may be coupled to the base 302 via threads, a mechanical lock (e.g., quarter-turn rotation), press-fit, or other suitable coupling mechanism.

As shown in FIG. 10, the bottom of the recess 802 has a cone-like depression that defines a media transfer region 1001 between the bottom 403 of the filter 303 and the base 302 when the sample probe 300 is assembled. Media transfer region 1001 and the previously described media transfer region 1002 encourage media to move through a greater surface area of the bottom 403 of the filter 303, thereby providing better filtration and reduced chances of clogging of the filter. The media transfer regions 1001 and 1002, which are cone-shaped, have respective cone-base radii defining their filter-adjacent openings. The cone-base radius of the media transfer region 1002 may be substantially identical to the radius 404 of the recess 401, while the cone-base radius of the media transfer region 1001 may be substantially identical to the outer radius of the filter 303. The cannula 301 is inserted into a cylindrical duct 1003 in the base 302 that connects the cannula 301 to the media transfer region 1001. An exterior grip portion 901 (FIG. 9) of the base 302 may have protrusion, knurls, or other features to improve grip on the base 302.

When the sample probe 300 is assembled, (i) the o-ring 304 seals the connection between the cap 305 and the base 302 to prevent medium leakage and (ii) the filter 303 is held in place and is closely fitted between the cap 305 and the base 302. Note that, by having the cap's projection 306 fit within the filter's recess 401, the surface area of the filter's porous bottom 403 can be larger than that of a comparable, conventional filter that is disposed within a cap, such as in sample probes 100 and 200 of FIGS. 1 and 2. This larger surface area leads to lower back pressure during reflux, as well as faster transfer of fluid through the filter.

Figure 11:
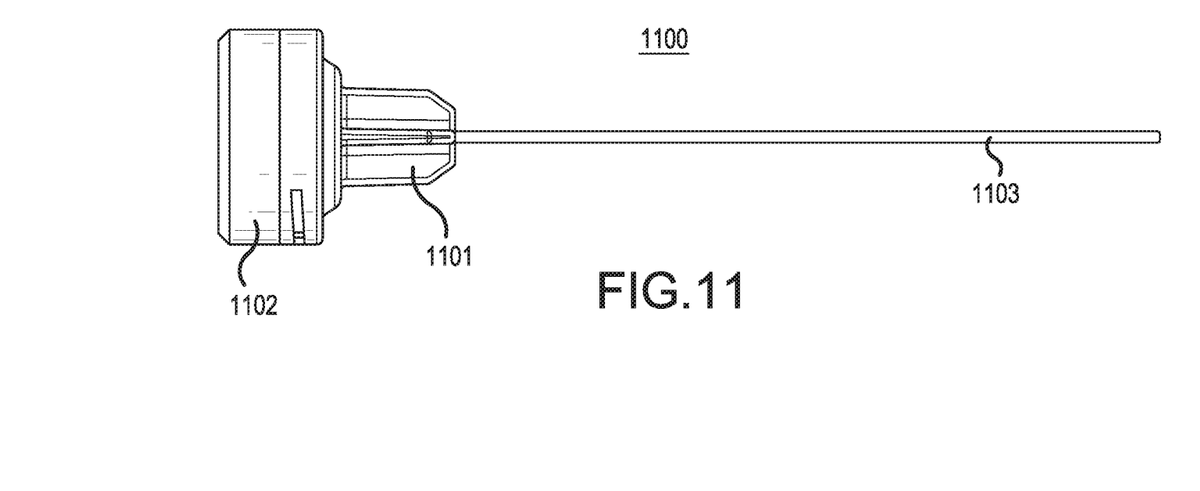
FIG. 11 is a side view of an assembled sample probe in accordance with another embodiment of the present invention.
Figure 12:
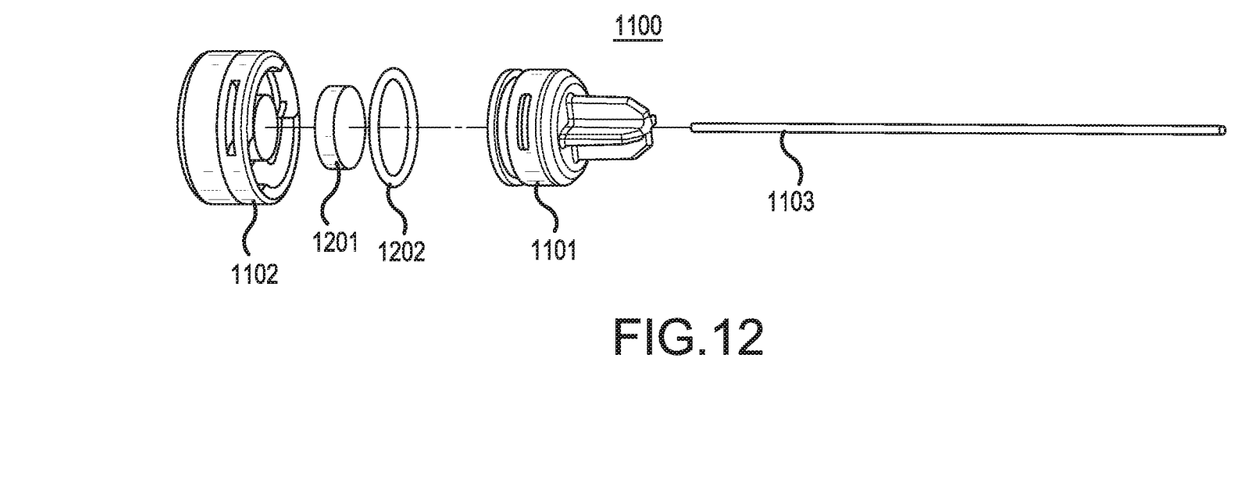
FIG. 12 is an exploded perspective view of the sample probe of FIG. 11.
Figure 13:
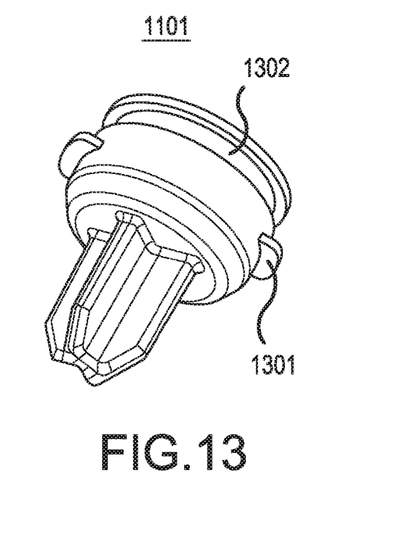
FIG. 13 is a perspective view of the base of the sample probe of FIG. 11.
Figure 14:
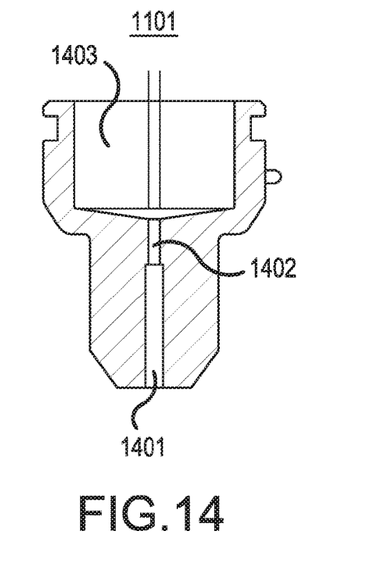
FIG. 14 is a side cross-sectional view of the base of the sample probe of FIG. 11.
Figure 15:
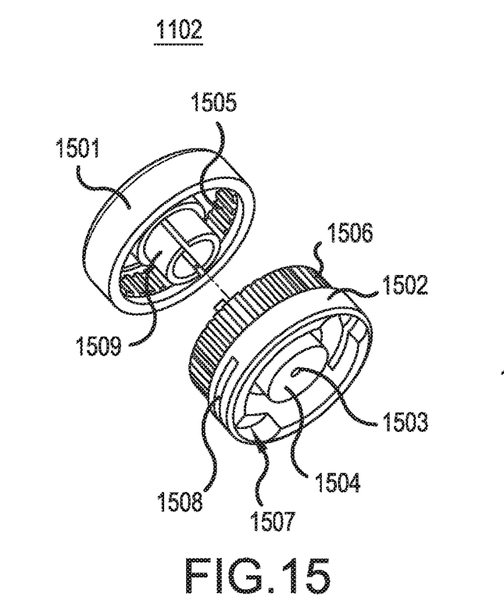
FIG. 15 is an exploded perspective view of the cap of the sample probe of FIG. 11.
Figure 16:
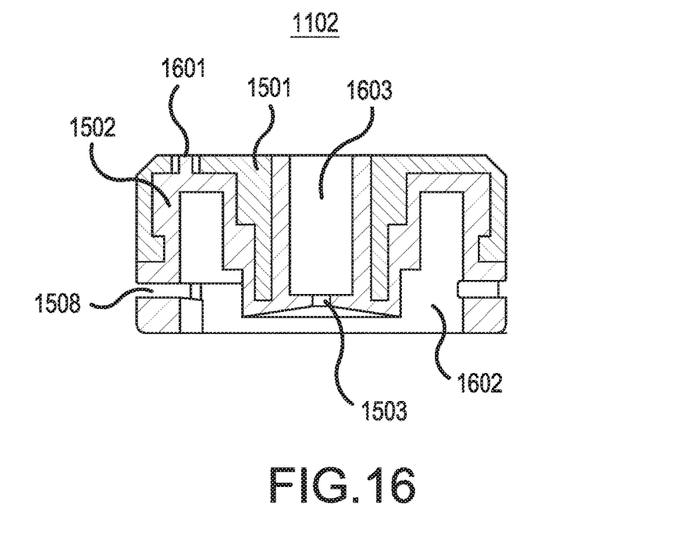
FIG. 16 is a side cross-sectional view of the cap of FIG. 11.
Figure 17:
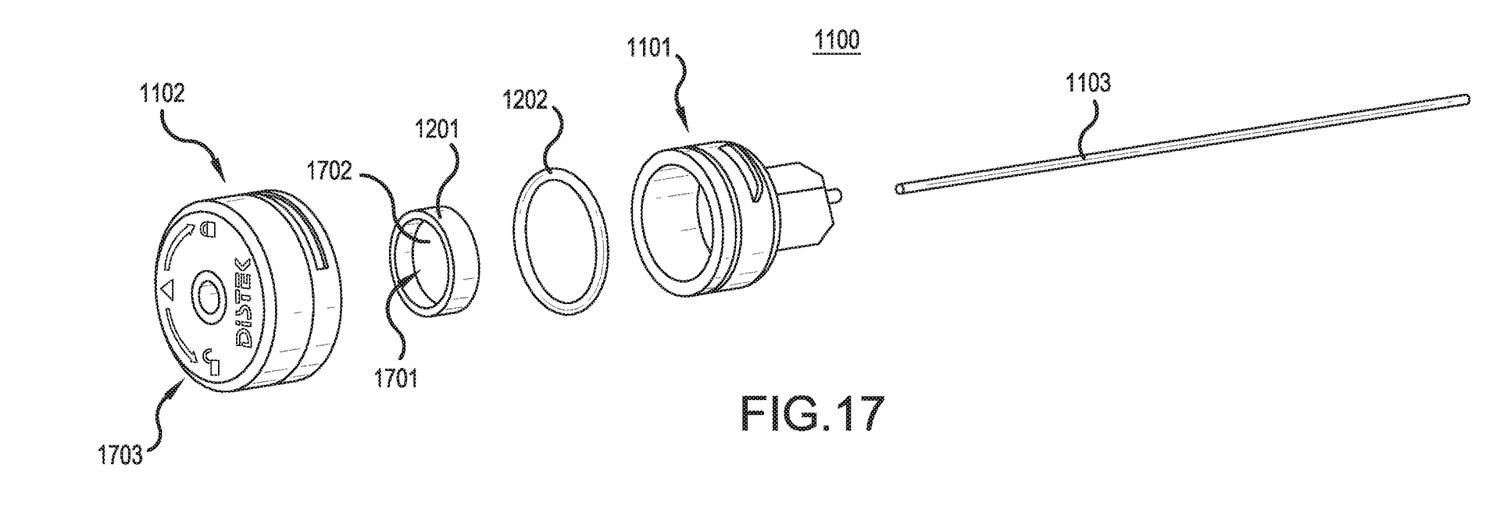
FIG. 17 is a different exploded perspective view of the sample probe of FIG. 11.
Figure 18:
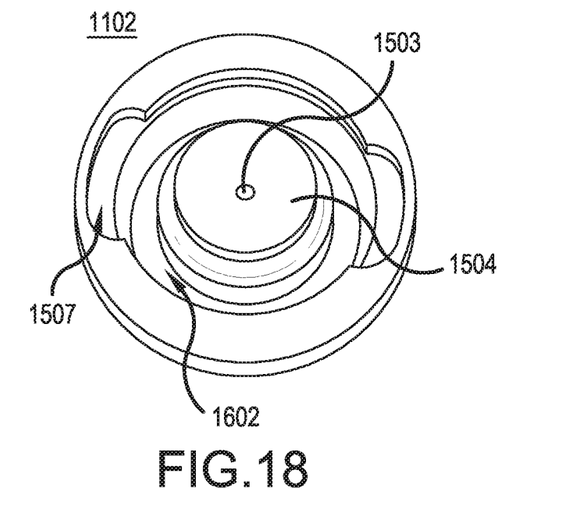
FIG. 18 is a perspective view of the cap of the sample probe of FIG. 11.
Figure 19:
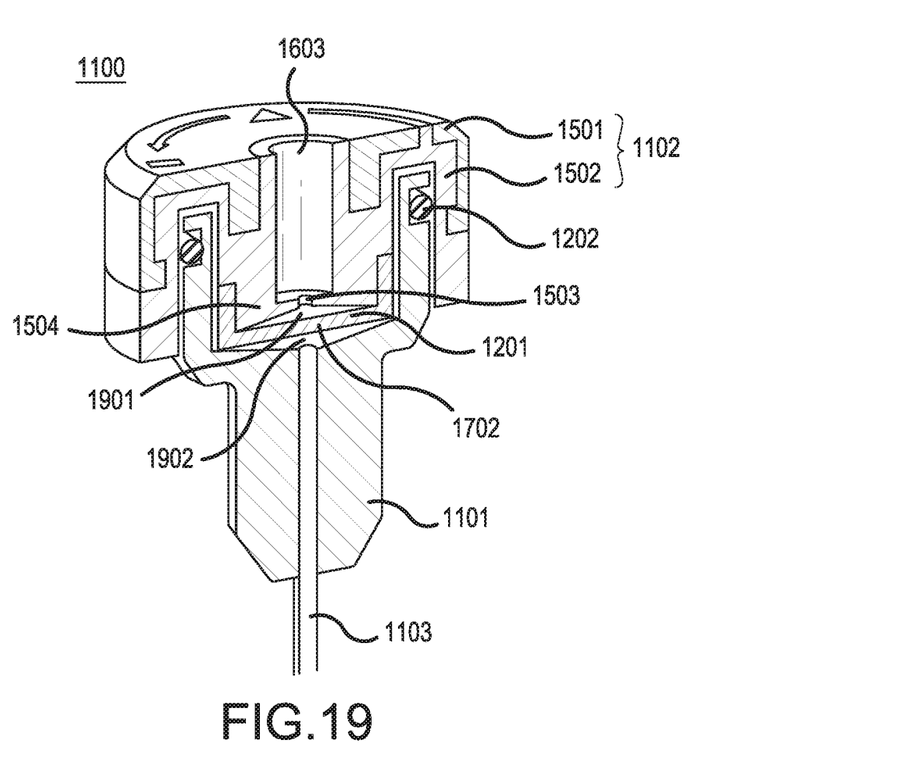
FIG. 19 is a cross-sectional perspective view of part of the assembled sample probe of FIG. 11.

FIG. 11 is a side view of an assembled sample probe 1100 in accordance with another embodiment of the present invention. FIG. 12 is an exploded perspective view of the sample probe 1100 of FIG. 11. FIG. 13 is a perspective view of the base 1101 of the sample probe 1100 of FIG. 11. FIG. 14 is a side cross-sectional view of the base 1101 of the sample probe 1100 of FIG. 11. FIG. 15 is an exploded perspective view of the cap 1102 of FIG. 11. FIG. 16 is a side cross-sectional view of the cap 1102 of FIG. 11. FIG. 17 is a different exploded perspective view of the sample probe 1100 of FIG. 11. FIG. 18 is a perspective view of the cap 1102 of the sample probe 1100 of FIG. 11. FIG. 19 is a cross-sectional perspective view of part of the assembled sample probe 1100 of FIG. 11.

The sample probe 1100 comprises a cannula 1103 inserted into a base 1101 that mates to a cap 1102 and includes a cylindrical filter 1201 disposed between the base 1101 and the cap 1102. The filter 1201 is substantially similar to the above-described filter 303 of FIG. 3. The filter 1201 has a recess 1701 and a bottom 1702, corresponding to, respectively, the recess 401 and the bottom 403 of the filter 303. The interaction of the filter 1201 with the projection 1504 (FIGS. 15 and 18) of the cap 1102 is substantially similar to the above-described interaction of the filter 303 with the projection 306 of the cap 305.

As shown in FIG. 15, the cap 1102 comprises a top portion 1501 and a bottom portion 1502. The bottom portion 1502 may be made of a rigid plastic. The top portion 1501 may be made of a different material that is more elastic so as to provide better grip support. The manufacture of the cap 1102 may include molding the top portion 1501 over the bottom portion 1502 to create a unitary cap 1102. Note that, in some embodiments, the bottom portion 1502 may need to have a substantially uniform thickness in order to make the bottom portion 1502 suitable for injection molding. Accordingly, the over-molding with the top portion 1501 fills in additional cavities in the bottom portion 1502 that may form from the substantially uniform-thickness requirement. This also helps prevent liquid from accumulating in or on the cap 1102, since cavities are filled and the top portion 1501 is flat and smooth.

The bottom portion 1502 may have features 1601 (FIG. 16) that extend through openings in the top portion 1501 to be flush with the top surface of the top portion 1501. As shown in FIG. 17, the top surface of the cap 1102 may be provided with indicia 1703 to show a user how to couple/decouple the cap 1102 with respect to the base 1101 (e.g., by turning clockwise/counterclockwise to lock/unlock). The indicia 1703 may comprise the flush exposed surfaces of the above-described features 1601 of the cap's bottom portion 1502 and/or may be disposed (e.g., by painting, printing, pressing, or embossing) on the exposed surface of the cap's top portion 1501.

As shown in FIG. 16, the cap 1102 also has a recess 1603 for receiving a channeled projection of the dissolution testing apparatus (not shown), where the recess 1603 and the projection form part of the fluid path from the cannula 1103 to the dissolution-testing apparatus for transporting the medium samples. The recess 1603 may be part of the bottom portion 1502 that extends all the way to the top of the cap 1102—in other words, the walls of the recess 1603 may be made of the rigid plastic of the bottom portion 1502.

As shown in FIG. 15, the top portion 1501 includes a slotted, cylindrical projection 1509 disposed in a corresponding recess (not shown) of the bottom portion 1502 for improved bonding of the top portion 1501 with the bottom portion 1502. The bottom portion 1502 may have a grooved exterior surface 1506 such that, when the top portion 1501 is molded over the bottom portion 1502, a corresponding grooved interior surface 1505 is formed in top portion 1501 for improved bonding of the top portion 1501 and bottom portion 1502, which is particularly helpful when the top portion 1501 is gripped and twisted, e.g., to couple the cap 1102 to the base 1101 or uncouple the cap 1102 from the base 1101.

The substantially cylindrical projection 1504 of the cap's bottom portion 1502 is sized to snugly fit within the recess 1701 of the filter 1201. As shown in FIG. 16, the bottom portion 1502 has a substantially annular recess 1602 that is defined by the projection 1504 and the outer wall of the bottom portion 1502 and receives the filter 1201, the o-ring 1202, and a portion of the base 1101 when the sample probe 1100 is assembled. Specifically, the outer radius of the projection 1504 is substantially equal to the inner radius of the filter's cylindrical recess 1701 so that the filter 1201 and the cap 1102 mate with a snug friction fit. The width of the recess 1602 may be sufficiently wide to allow easy manual access to the filter 1201 for easy placement and removal by sliding the filter 1201 on or off of the projection 1504 when the cap 1102 is decoupled from the base 1101.

As shown in FIG. 19, the recess 1603 extends partially inside the projection 1504. The distal end of the projection 1504 has a cone-like depression that forms media transfer region 1901 between the projection 1504 and the filter's bottom 1702. A relatively short and narrow duct 1503 connects the media transfer region 1901 to the recess 1603.

Because, as described above, the filter 1201 is disposed within the relatively wide recess 1602, the filter 1201 can easily be accessed for removal by sliding and/or flexing filter 1201 off of the projection 1504 when the cap 1102 is decoupled from the base 1101. Note that, as shown in FIG. 15, the bottom portion 1502 has recesses 1507 that are open to the recess 1602 and corresponding lateral grooves 1508 (see also FIG. 16) in the exterior of the bottom portion 1502, where the recesses 1507 provide additional room for comfortably manually gripping the filter 1201. In some embodiments, the distance from the filter 1201 to the far walls of the recesses 1507 is at least 4 mm to allow sufficient manual access for removal of the filter 1201 from the projection 1504. Each recess 1507 and groove 1508 accepts a corresponding below-described protrusion of the base 1101. Note that, when assembled, the filter 1201 preferably does not extend or project beyond the cap 1102 and is entirely within the recess 1602.

As shown in FIG. 14, the base 1101 has a recess 1403 that receives the filter 1201 and the portion of the cap 1102 having the projection 1504. The base 1101 has an external circumferential groove 1302 that receives the o-ring 1202, which is sized to fit snugly in the groove 1302. The o-ring 1202 forms a seal between the cap 1102 and the base 1101 when the sample probe 1100 is assembled, which helps to prevent leakages of medium during sampling.

The base 1101 has at least one external lateral protrusion 1301 that fits into a corresponding recess 1507 and lateral groove 1508 in the cap 1102 so that, when the sample probe 1100 is assembled, the cap 1102 may be securely locked to the base 1101. In order to lock the cap 1102 to the base 1101, first a portion of the base 1101 is inserted into the recess 1602 of the cap 1102 and, correspondingly, a portion of the cap 1102, together with the filter 1201, is inserted into the recess 1403 of the base 1101 such that the projection 1504 of the cap 1102 is within the recess 1403 of the base 1101 and each lateral protrusion 1301 of the base 1101 is within a corresponding recess 1507 of the cap 1102. Then, while keeping the cap 1102 in contact with the base 1101, the cap 1102 is rotated relative to the base 1101 so that each protrusion 1301 slides into a corresponding groove 1508, thereby locking the cap 1102 to the base 1101. The groove 1508 and/or the protrusion 1301 may be shaped and/or have sub-protrusions so as to increase the tightness of the lock. Similarly, alternative coupling mechanisms may be used instead of protrusion 1301 and groove 1508 to help prevent an undesirable separation of components of the assembled sample probe 1100 (e.g., during reflux).

As shown in FIGS. 14 and 19, the bottom of the base's recess 1403 has a cone-like depression that defines a media transfer region 1902 formed between the filter 1201 and the base 1101 when the sample probe 1100 is assembled. The cannula 1103 is inserted into a duct section 1401 of the base 1101 that connects the cannula 1103 to the media transfer region 1902 via a slightly narrower duct section 1402. As described above, the relative width of the filter 1201, combined with the media transfer regions 1902 and 1901, helps increase the efficiency and accuracy of sampling using the sample probe 1100 by reducing flow resistance and the chances of blockage and/or contamination.

Although the invention has been set forth in terms of the exemplary embodiments described herein and illustrated in the attached documents, it is to be understood that such disclosure is purely illustrative and is not to be interpreted as limiting. Consequently, various alterations, modifications, and/or alternative embodiments and applications may be suggested to those skilled in the art after having read this disclosure. Accordingly, it is intended that the invention be interpreted as encompassing all alterations, modifications, or alternative embodiments and applications as fall within the true spirit and scope of this disclosure. For example, alternative embodiments may use any suitable combination of features from the described embodiments. Selected enumerated embodiments are provided below.

1. An article of manufacture comprising a cap having a projection with a duct through the projection and a base having a recess and a duct in fluid communication with the recess, wherein: the projection is adapted to fit within a recess of a filter to form a cap-filter assemblage, the filter and the projection of the cap-filter assemblage are adapted to fit within the recess of the base to form a cap-filter-base assemblage, the cap-filter-base assemblage defines at least one media transfer region adjacent to the filter, and the duct of the base in the cap-base assemblage is adapted to receive a cannula to form a sample probe.

2. The article of embodiment 1, wherein the filter is adapted to be disposed on the outside of the cap allowing for unobstructed manual access for removal of the filter from the projection.

3. The article of any one of embodiments 1-2, wherein the filter has a substantially cylindrical shape, the filter's recess is substantially cylindrical, the recess has a depth and a radius, the cap's projection has a substantially cylindrical exterior having a radius, and the radius of the filter's recess is substantially the same as the radius of the cap's projection, so as to achieve a snug fit.

4. The article of embodiment 3, wherein the recess's depth is smaller than the recess's radius.

5. The article of embodiment 4, wherein the recess's depth is less than half of the recess's radius.

6. The article of any one of embodiments 1-5, wherein the base comprises a lateral channel, the cap comprises a lateral protrusion adapted to fit in, engage with, and disengage from, the base's lateral channel, engagement of the lateral protrusion with lateral channel is achieved by rotating the cap relative to the base in a first direction while the cap's projection is inserted in the base's recess, and disengagement of the lateral protrusion from the lateral channel is achieved by rotating the cap relative to the base in a second direction opposite the first direction.

7. The article of embodiment 6, wherein the base's lateral channel is formed in a raised rim on a proximal side of the base that also comprises a corresponding complementary rimless section.

8. The article of any one of embodiments 1-7, wherein a first media transfer region is defined by an inner surface of the filter and a cone-like depression in the cap's projection that is in fluid communication with the cap's duct.

9. The article of embodiment 8, wherein a second media transfer region is defined by an outer surface of the filter and a cone-like depression in the base that is in fluid communication with the base's duct.

10. The article of embodiment 9, wherein the first media transfer region has a corresponding first cone-base radius, the second media transfer region has a corresponding second cone-base radius, the filter and the filter's recess are substantially cylindrical, the filter has an outer filter radius that is substantially identical to the second cone-base radius, and the filter's recess has a radius that is substantially identical to the first cone-base radius.

11. The article of any one of embodiments 1-10, wherein the cap-filter-base assemblage defines two media transfer regions that are adjacent to opposite sides of the filter.

12. The article of any one of embodiments 1-11, wherein the cap comprises a top portion and a bottom portion, the bottom portion comprises a rigid plastic, and the top portion comprises a more elastic material than the rigid plastic, for providing better grip support.

13. The article of embodiment 12, wherein the top portion is molded over the bottom portion, and the bottom portion comprises features that extend through openings in the top portion to be flush with the top surface of the top portion.

14. The article of embodiment 13, wherein the top surface of the cap is provided with indicia to show how to couple and decouple the cap with respect to the base, and the indicia comprise the flush exposed surfaces of the features of the bottom portion that extend through the openings in the top portion.

15. The article of any one of embodiments 12-14, wherein the bottom portion has a grooved exterior surface and the top portion has a corresponding grooved interior surface for improved bonding between the top and bottom portions.

16. The article of any one of embodiments 1, 3-5, and 8-15, wherein the distal end of the cap comprises a substantially annular recess defined by the cap's projection and an outer wall of the cap, the projection is disposed within the cap's recess, the cap's recess is adapted to receive the filter, such that the filter is within the cap's cavity when the cap-filter assemblage is formed, and the cap's recess is adapted to receive a portion of the base when the cap-filter-base assemblage is formed.

17. The article of embodiment 16, wherein the dimensions of the cap's recess are such as to allow manual access for removal of the filter from the projection.

18. The article of any one of embodiments 16-17, wherein the cap's recess has a first supplementary recess at the distal end of the cap, which provides additional room for manually gripping the filter.

19. The article of embodiment 18, wherein the base comprises a lateral protrusion, the cap's recess further comprises a lateral groove connected to the first supplementary recess and adapted to accept the lateral protrusion, and the cap is lockable to the base by inserting a portion of the cap, including the filter, into the base's recess, correspondingly inserting a portion of the base, including the lateral protrusion, into the cap's recess, wherein the lateral protrusion is inserted into the first supplementary recess, and rotating the cap relative to the base such that the base's lateral protrusion slides into the lateral groove connected to the first supplementary recess.

20. The article of any one of embodiments 18-19, wherein the cap's recess comprise a second supplementary recess at the distal end of the cap located opposite from the first supplementary recess and that provides additional room for manually gripping the filter.

21. The article of any one of embodiments 16-20, wherein the proximal portion of the base comprises an external circumferential groove adapted to receive an o-ring and the cap's recess is further adapted to receive the o-ring when the cap-filter-base assemblage is formed.

22. The filter for the article of manufacture of any one of embodiments 1-21.

It will be understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. An article of manufacture comprising:
a cap having a projection with a duct through the projection; and
a base having a recess and a duct in fluid communication with the recess of the base, wherein:
the projection is adapted to fit within a recess of a filter to form a cap-filter assemblage;
the filter and the projection of the cap-filter assemblage are adapted to fit within the recess of the base to form a cap-filter-base assemblage;
the cap-filter-base assemblage defines at least one media transfer region adjacent to the filter; and
the duct of the base in the cap-filter-base assemblage is adapted to receive a cannula to form a sample probe;
a first cone-shaped media transfer region is defined by an inner surface of the filter and a cone-like depression in the cap's projection that is in fluid communication with the cap's duct such that the larger end of the first cone-shaped media transfer region faces a bottom of the filter;

a second cone-shaped media transfer region is defined by an outer surface of the filter and a cone-like depression in the base that is in fluid communication with the base's duct such that the larger end of the second cone-shaped media transfer region faces the bottom of the filter;

the distal end of the cap comprises a substantially annular recess defined by the cap's projection and an outer wall of the cap;

the cap's projection is disposed within the cap's recess;

the cap's recess is adapted to receive the filter, such that the filter is within the cap's recess when the cap-filter assemblage is formed;

the cap's recess is adapted to receive a portion of the base when the cap-filter-base assemblage is formed; and the cap's recess has a first supplementary recess at the distal end of the cap, which provides additional room for manually gripping the filter.

2. The article of claim 1, wherein the projection of the cap is adapted to fit within the recess of the filter with the filter disposed on the outside of the projection of the cap allowing for unobstructed manual access for removal of the filter from the projection.

3. The article of claim 1, wherein:
the filter has a substantially cylindrical shape;
the filter's recess is substantially cylindrical;
the filter's recess has a depth and a radius;
the cap's projection has a substantially cylindrical exterior having a radius; and
the radius of the cap's projection is sized relative to the radius of the filter's recess, so as to achieve a snug fit between the filter and the cap's projection.

4. The article of claim 3, wherein the filter's recess's depth is smaller than the filter's recess's radius.

5. The article of claim 4, wherein the filter's recess's depth is less than half of the filter's recess's radius.

6. The article of claim 1, wherein:
the cap comprises a lateral channel;
the base comprises a lateral protrusion adapted to fit in, engage with, and disengage from, the cap's lateral channel;
engagement of the lateral protrusion with the cap's lateral channel is achieved by rotating the cap relative to the base in a first direction while the cap's projection is inserted in the base's recess; and
disengagement of the lateral protrusion from the cap's lateral channel is achieved by rotating the cap relative to the base in a second direction opposite the first direction.

7. The article of claim 6, wherein the cap's lateral channel is formed in a raised rim on a proximal side of the cap that also comprises a corresponding complementary rimless section.

8. The article of claim 1, wherein:
the first cone-shaped media transfer region has a corresponding first cone-base radius;
the second cone-shaped media transfer region has a corresponding second cone-base radius;
the filter and the filter's recess are substantially cylindrical;
the filter has an outer filter radius that is substantially identical to the second cone-base radius; and the filter's recess has a radius that is substantially identical to the first cone-base radius.

9. The article of claim 1, wherein the cap-filter-base assemblage defines two media transfer regions that are adjacent to opposite sides of the filter.

10. The article of claim 1, wherein:
the cap comprises a top portion and a bottom portion;
the bottom portion comprises a rigid plastic; and
the top portion comprises a more elastic material than the rigid plastic, for providing better grip support.

11. The article of claim 10, wherein:
the top portion is molded over the bottom portion; and
the bottom portion comprises features that extend through openings in the top portion to be flush with the top surface of the top portion.

12. The article of claim 11, wherein:
the top surface of the cap is provided with indicia to show how to couple and decouple the cap with respect to the base; and
the indicia comprise the flush exposed surfaces of the features of the bottom portion that extend through the openings in the top portion.

13. The article of claim 10, wherein:
the bottom portion has a grooved exterior surface; and
the top portion has a corresponding grooved interior surface configured to mate with the grooved exterior surface of the bottom portion for improved bonding between the top and bottom portions.

14. The article of claim 1, wherein:
the base comprises a lateral protrusion;
the cap's recess further comprises a lateral groove connected to the first supplementary recess and adapted to accept the lateral protrusion; and
the cap is lockable to the base by:
inserting a portion of the cap, including the filter, into the base's recess;
correspondingly inserting a portion of the base, including the lateral protrusion, into the cap's recess, wherein the lateral protrusion is inserted into the first supplementary recess; and
rotating the cap relative to the base such that the base's lateral protrusion slides into the lateral groove connected to the first supplementary recess.

15. The article of claim 1, wherein the cap's recess comprise a second supplementary recess at the distal end of the cap located opposite from the first supplementary recess and that provides additional room for manually gripping the filter.

16. The article of claim 1, wherein:
the proximal portion of the base comprises an external circumferential groove adapted to receive an o-ring; and
the cap's recess is further adapted to receive the o-ring when the cap-filter-base assemblage is formed.

17. The filter for the article of manufacture of claim 1.

18. An article of manufacture comprising:
a cap having a projection with a duct through the projection; and
a base having a recess and a duct in fluid communication with the recess of the base, wherein:
the projection is adapted to fit within a recess of a filter to form a cap-filter assemblage;
the filter and the projection of the cap-filter assemblage are adapted to fit within the recess of the base to form a cap-filter-base assemblage;
the cap-filter-base assemblage defines at least one media transfer region adjacent to the filter;

the duct of the base in the cap-filter-base assemblage is adapted to receive a cannula to form a sample probe;
a first cone-shaped media transfer region is defined by an inner surface of the filter and a cone-like depression in the cap's projection that is in fluid communication with the cap's duct such that the larger end of the first cone-shaped media transfer region faces a bottom of the filter;
a second cone-shaped media transfer region is defined by an outer surface of the filter and a cone-like depression in the base that is in fluid communication with the base's duct such that the larger end of the second cone-shaped media transfer region faces the bottom of the filter;
the cap comprises a top portion and a bottom portion;
the bottom portion comprises a rigid plastic; and
the top portion comprises a more elastic material than the rigid plastic, for providing better grip support.

19. The article of claim 18, wherein:
the top portion is molded over the bottom portion; and
the bottom portion comprises features that extend through openings in the top portion to be flush with the top surface of the top portion.

20. The article of claim 19, wherein:
the top surface of the cap is provided with indicia to show how to couple and decouple the cap with respect to the base; and
the indicia comprise the flush exposed surfaces of the features of the bottom portion that extend through the openings in the top portion.

21. The article of claim 18, wherein:
the bottom portion has a grooved exterior surface; and
the top portion has a corresponding grooved interior surface configured to mate with the grooved exterior surface of the bottom portion for improved bonding between the top and bottom portions.

* * * * *